United States Patent
Yabe

(10) Patent No.: US 11,005,927 B2
(45) Date of Patent: May 11, 2021

(54) SERVER SYSTEM, METHOD FOR CONTROLLING SERVER SYSTEM, AND STORAGE MEDIUM

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 234 days.

(21) Appl. No.: 15/406,449

(22) Filed: Jan. 13, 2017

(65) Prior Publication Data

US 2017/0208122 A1 Jul. 20, 2017

(30) Foreign Application Priority Data

Jan. 18, 2016 (JP) .............................. JP2016-007428

(51) Int. Cl.
*H04L 29/08* (2006.01)
*H04L 29/06* (2006.01)

(52) U.S. Cl.
CPC ...... *H04L 67/1029* (2013.01); *H04L 67/1008* (2013.01); *H04L 67/42* (2013.01); *H04L 67/02* (2013.01)

(58) Field of Classification Search
CPC ... G06F 9/50; H04L 67/1029; H04L 67/1008; H04L 67/42; H04L 67/02; H04L 12/1831; H04L 12/1863; H04L 43/00; H04L 67/32; H04L 69/00

See application file for complete search history.

(56) References Cited

U.S. PATENT DOCUMENTS

| | | | | |
|---|---|---|---|---|
| 8,812,586 B1* | 8/2014 | Kulkarni | | H04L 41/065 709/203 |
| 2004/0226013 A1* | 11/2004 | Mariotti | | G06F 11/008 718/100 |
| 2005/0120160 A1* | 6/2005 | Plouffe | | G06F 9/45537 711/1 |
| 2008/0046558 A1* | 2/2008 | Raja | | H04L 41/5009 709/224 |
| 2009/0210887 A1* | 8/2009 | Yeom | | G06Q 10/06 719/318 |
| 2014/0115335 A1* | 4/2014 | Jorden | | G07C 5/008 713/169 |
| 2014/0173130 A1* | 6/2014 | Uluderya | | G06F 9/5055 709/238 |
| 2014/0259014 A1* | 9/2014 | Watanabe | | G06F 9/5077 718/1 |
| 2014/0324862 A1* | 10/2014 | Bingham | | G06F 9/45533 707/737 |
| 2015/0150123 A1* | 5/2015 | Be'ery | | H04L 63/1416 726/22 |
| 2015/0222517 A1* | 8/2015 | McLaughlin | | H04L 63/0435 713/156 |

(Continued)

FOREIGN PATENT DOCUMENTS

JP 2012185577 A 9/2012

*Primary Examiner* — Tonia L Dollinger
*Assistant Examiner* — Jihad K Boustany
(74) *Attorney, Agent, or Firm* — Canon U.S.A., Inc. IP Division

(57) ABSTRACT

A health check script for confirming a response from an application is disposed in a server, and a load balancer monitors a response to the health check script from the server.

9 Claims, 9 Drawing Sheets

(56) References Cited

U.S. PATENT DOCUMENTS

| | | | | |
|---|---|---|---|---|
| 2015/0234695 A1* | 8/2015 | Cuthbert | ............. | G06F 11/0751 |
| | | | | 714/47.1 |
| 2015/0296022 A1* | 10/2015 | Kim | ........................ | H04L 67/12 |
| | | | | 709/203 |
| 2016/0006814 A1* | 1/2016 | Park | .................... | H04L 41/0833 |
| | | | | 709/223 |
| 2016/0028855 A1* | 1/2016 | Goyal | ...................... | H04L 67/16 |
| | | | | 709/203 |

* cited by examiner

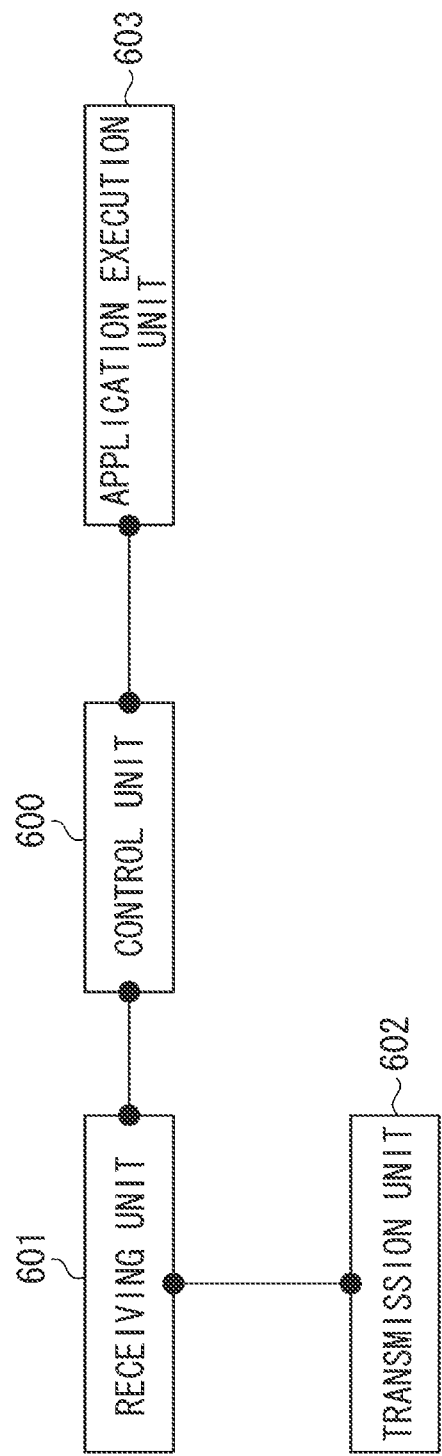

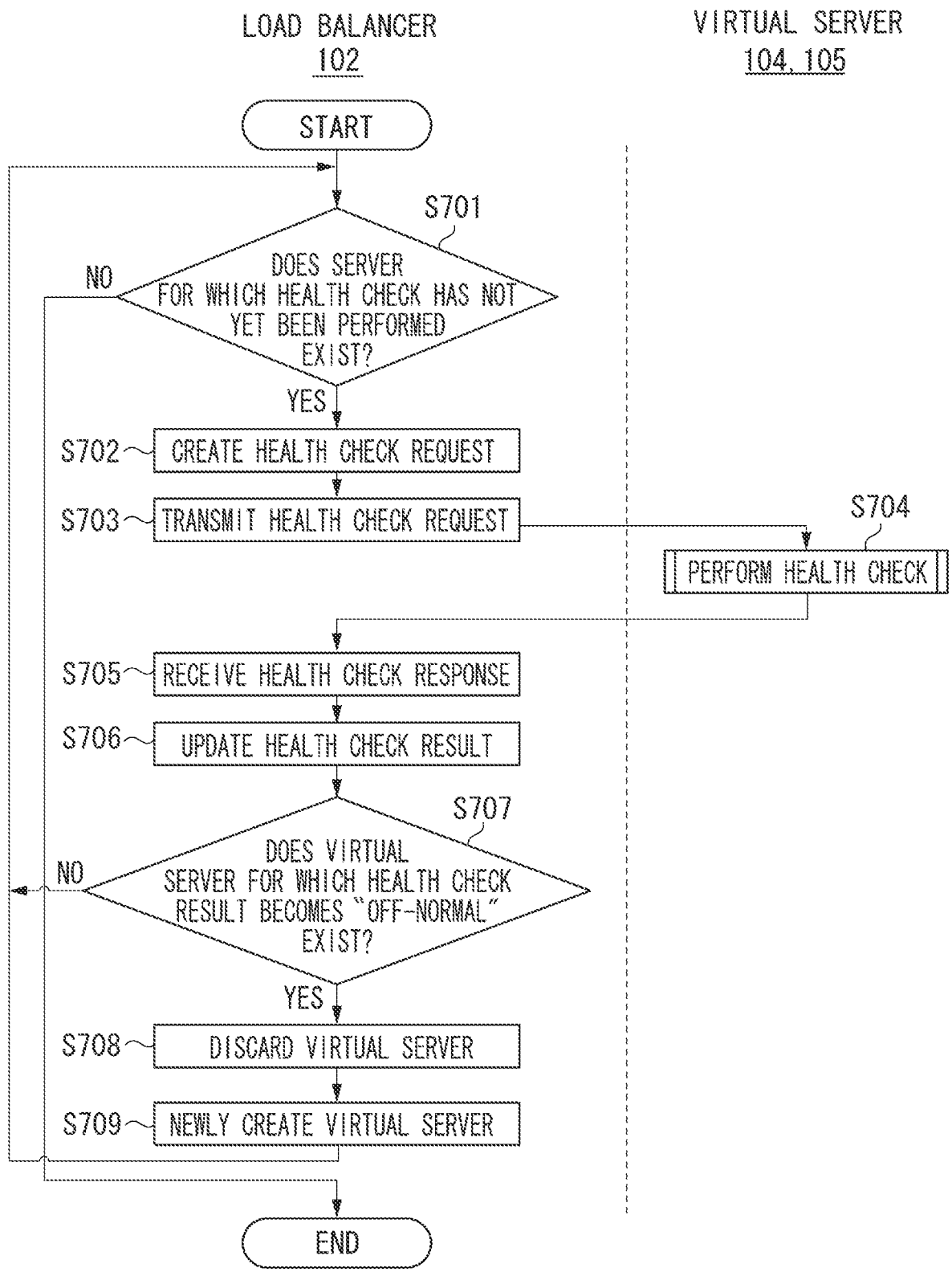

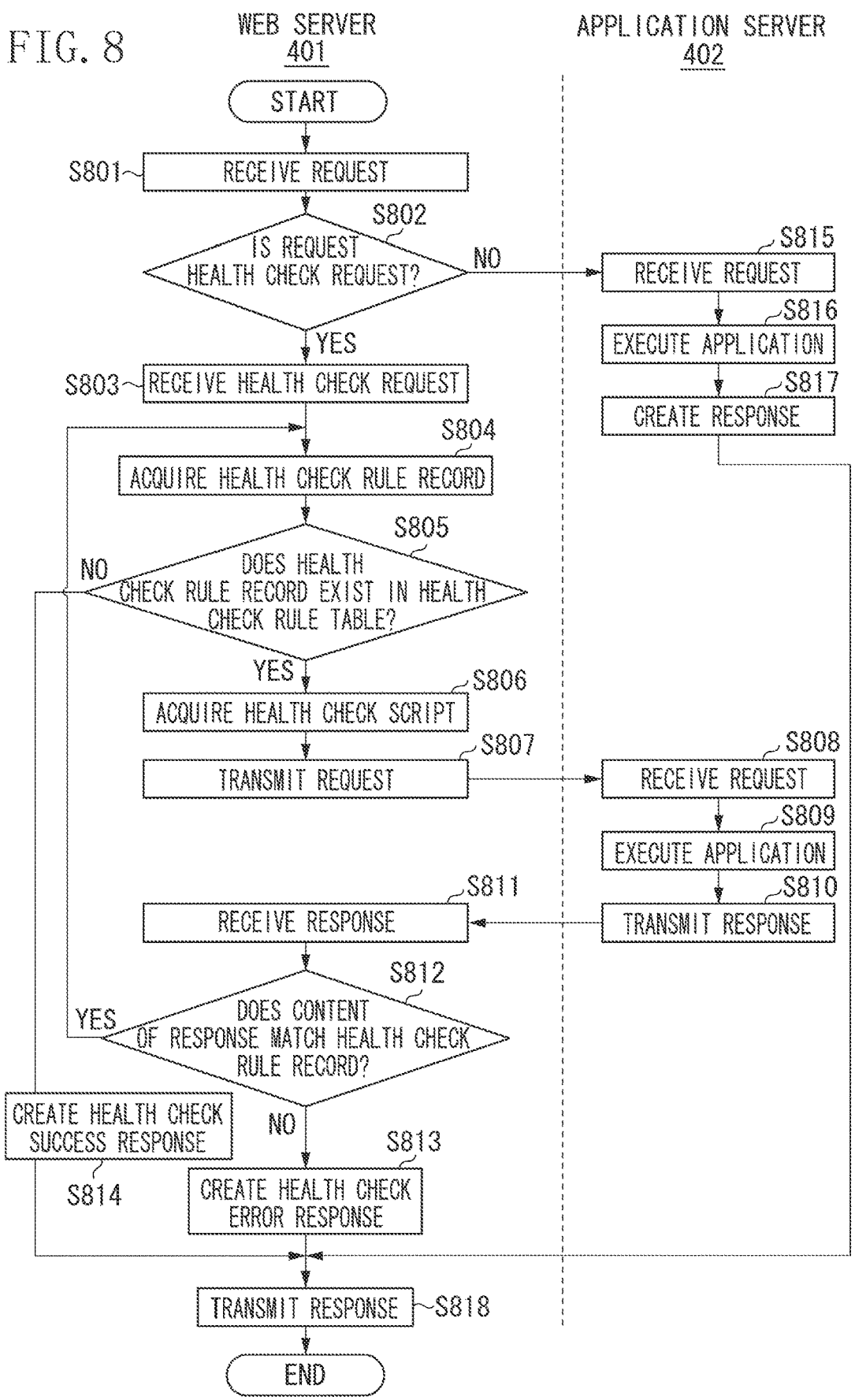

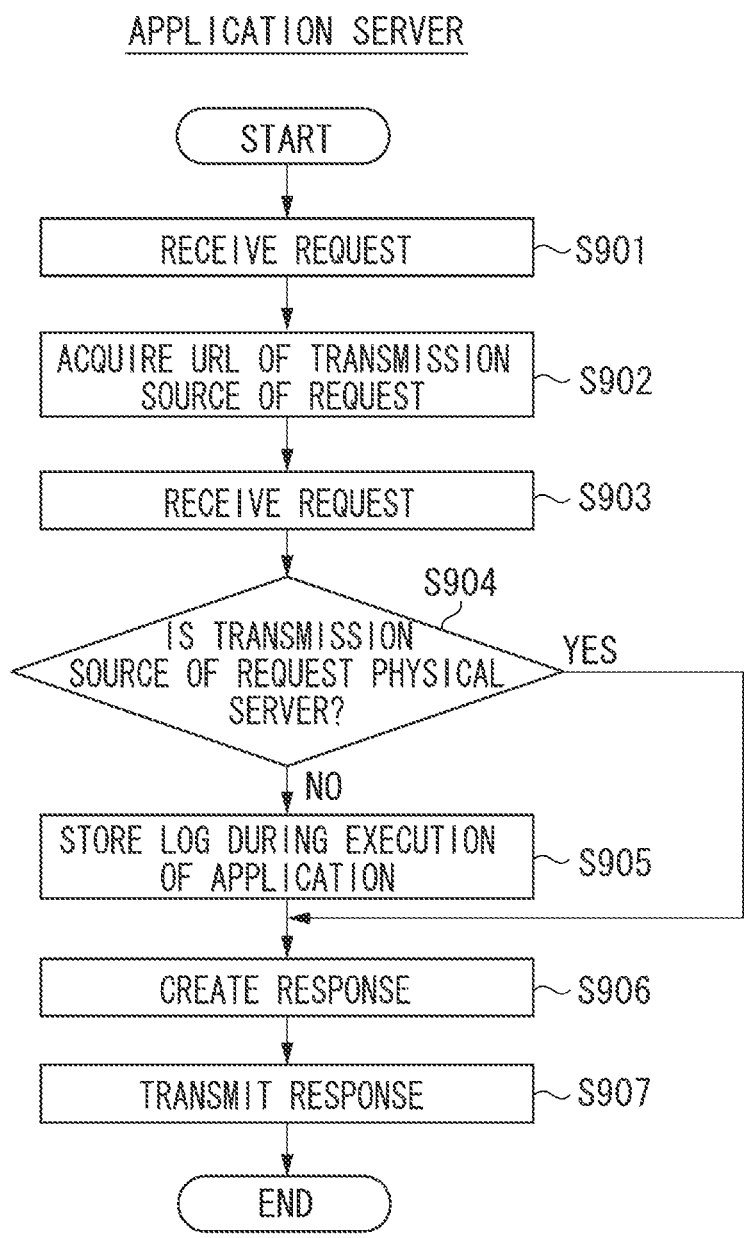

SERVER SYSTEM, METHOD FOR CONTROLLING SERVER SYSTEM, AND STORAGE MEDIUM

BACKGROUND OF THE INVENTION

Field of the Invention

The present invention relates to a server system connected to a load balancer and including a virtual server, a method for controlling the server system, and a storage medium.

Description of the Related Art

In a client server system including clients and a server, as the number of the clients increases, a load on the server increases, and the processing capability of the entire system decreases. Thus, there has been provided a load distribution technique serving as a technique for connecting a plurality of servers and showing clients as if the plurality of servers is one large-scaled server. To implement load distribution, a load distribution device, which monitors respective operational statuses of the servers and uniformly distributes a request from the client among the servers so that the request is not concentrated on the specific server, is required. The load distribution device may also be referred to as a load balancer.

In a conventional load balancer, there is a technique for acquiring a CPU utilization rate of a server and transferring a request from a client to a server having a low CPU utilization rate to make a load status of an entire system uniform. In a load balancer, there is a technique for virtually operating an application program operating on a server and grasping an operational status of a system after confirming whether a normal response is returned (see Japanese Patent Application Laid-Open No. 2012-185577). Confirmation work performed to grasp the operational status of the system is referred to as a health check.

In the conventional load balancer, only an operational status of the server can be determined, and it cannot be determined whether an application operating on the server can normally operates. On the other hand, in the technique discussed in Japanese Patent Application Laid-Open No. 2012-185577, in a configuration in which a plurality of applications operates on the server, a function corresponding to a health check from the load balancer needs to be mounted on each of the applications.

SUMMARY OF THE INVENTION

The present invention is directed to performing, in a configuration in which a plurality of applications operates on a server, a health check of each of the applications without mounting a function corresponding to the health check on the application.

According to an aspect of the present invention, a server system capable of communicating with a load balancer which transmits a request from a client in a distributed manner and including a plurality of virtual servers includes a receiving unit configured to receive a health check transmitted from the load balancer to each of the virtual servers to confirm whether the virtual server can be a transmission target of the request, a transmission unit configured to transmit any request previously determined to each of a plurality of web applications disposed in the virtual server which has received the health check in response to the receiving unit having received the health check, and a control unit configured to receive a corresponding response to the any request transmitted by the transmission unit from each of the web applications and transmit a success in the health check to the load balancer in response to confirming that all the received responses indicate that the web applications are normally operating.

Further features of the present invention will become apparent from the following description of exemplary embodiments with reference to the attached drawings.

In the present invention, in a configuration in which a plurality of applications operates on a server, a health check of each of the applications can be performed without a function corresponding to the health check being mounted on the application.

BRIEF DESCRIPTION OF THE DRAWINGS

FIG. 6 illustrates a software configuration of an application server.
FIG. 7 is a flowchart illustrating a series of processes for a load balancer to perform a health check of a server.
FIG. 8 is a flowchart illustrating health check processing performed by a web server.
FIG. 9 is a flowchart illustrating log output processing performed by an application server.

DESCRIPTION OF THE EMBODIMENTS

Figure 1:
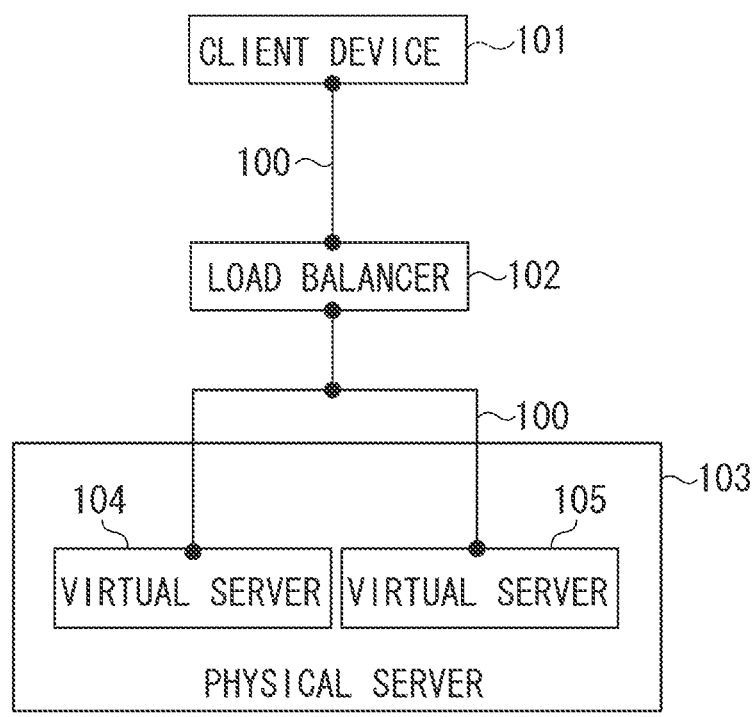
FIG. 1 illustrates an entire configuration of a system.

Exemplary embodiments for implementing the present invention will be described below with reference to the drawings. A first exemplary embodiment will be described below. FIG. 1 is a block diagram illustrating an entire configuration of a web application system according to the exemplary embodiment of the present invention. A network 100 is a communication path via which a client device 101, a load balancer 102, a physical server 103, and virtual servers 104 and 105 among components in the block diagram illustrated in FIG. 1 are connected to one another. The network 100 may be a base for performing communication among the components and may be an intranet, the Internet, or other network systems. The client device 101 is communicable with the load balancer 102, the physical server 103, and the virtual servers 104 and 105 via the network 100 among the components in the block diagram illustrated in FIG. 1.

While the present exemplary embodiment presupposes that the client device 101 is a personal computer (hereinafter referred to as a PC), it doesn't matter what type of terminal is used if the terminal has a communication function via the network 100. The load balancer 102 is a device which suppresses a load per one of servers constituting the web application system. The load balancer 102 distributes a request to the web application system, which is transmitted from the client device 101 via the network 100, to the virtual server 104 on the physical server 103.

The web application system in the present exemplary embodiment will be described as including the plurality of virtual servers 104 and 105 operating on the physical server 103. The physical server 103 makes the client device 101 use a web application via the network 100.

Each of the virtual servers 104 and 105 is a virtual server device implemented by application software operating on the physical server 103. When dedicated virtual machine software is executed on hardware of the physical server 103, a plurality of virtual server devices can be disposed. The application software constituting the web application system is disposed in each of the virtual servers 104 and 105, and each of the virtual servers 104 and 105 executes the request from the client device 101. The load balancer 102 monitors an operational status of each of the virtual servers 104 and 105, as needed. While only the physical server 103 is described in FIG. 1, the number of physical servers is not limited to one. A configuration in which one or more physical servers are prepared, a plurality of virtual servers is made to operate within each of the physical servers, and each of the virtual servers processes the request distributed thereto by the load balancer 102 is assumed. The number of physical servers 103 may be one and only one of virtual servers in the physical server 103 may be operating.

Figure 2:
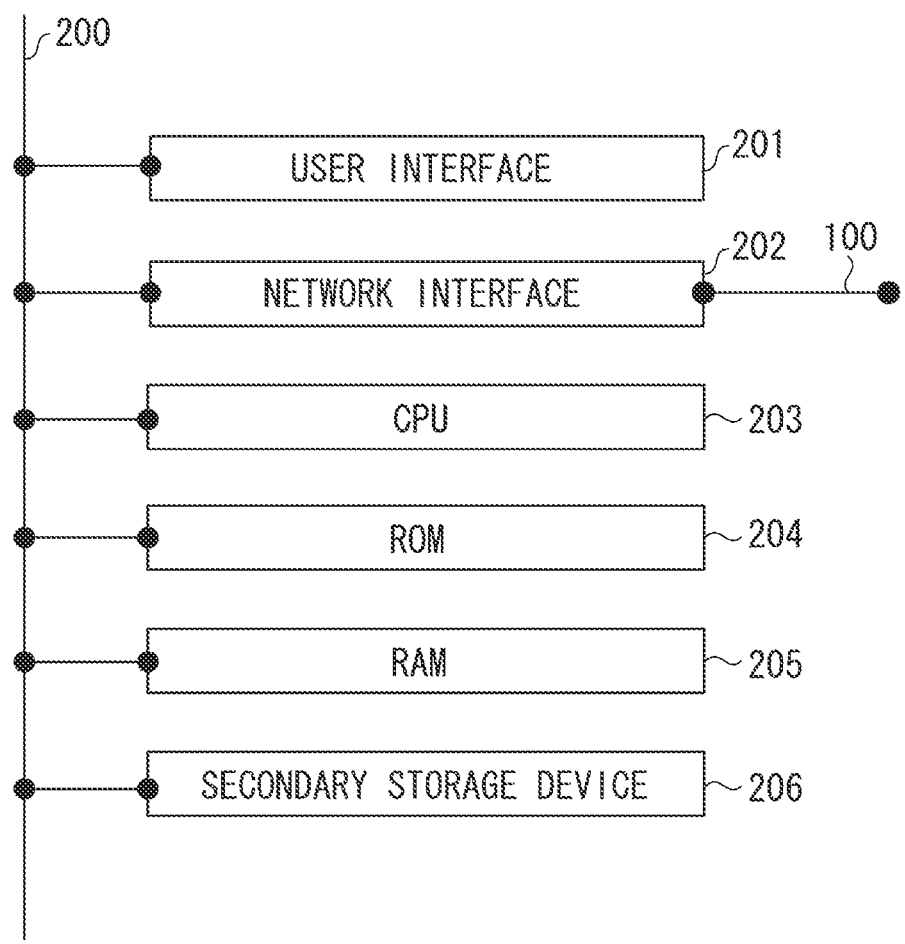
FIG. 2 illustrates a hardware configuration of a computer.

FIG. 2 is a block diagram illustrating an example of a hardware configuration of the client device 101, the load balancer 102, and the physical server 103. A system bus 200 is a bus connecting pieces of hardware to one another. In the present exemplary embodiment, the system bus 200 makes a control instruction from a central processing unit (CPU) 203 propagate to each of the pieces of hardware connected to the system bus 200 if not otherwise specified. A user interface 201 is hardware which inputs and outputs information with a display, a keyboard, a mouse, or the like. A computer including no hardware can also be connected and operated from another computer via the network 100 by remote control or the like.

A network interface 202 is hardware which is connected to a network such as the network 100 and communicates with the other computer or a network device. The CPU 203 executes a program read from a read-only memory (ROM) 204, a random access memory (RAM) 205, or a secondary storage device 206, and implements each of functions. The CPU 203 directly or indirectly controls each of the components connected via the system bus 200. The ROM 204 is a read-only storage device, and stores a program and data which have already been incorporated, e.g., a Basic Input/Output System (BIOS). The RAM 205 is a temporary memory area used as a work area for the CPU 203 to operate. The secondary storage device 206 is an external storage device represented by a hard disk drive (HDD) storing an operating system (OS) serving as basic software and other software modules. In each of the virtual servers 104 and 105, each of hardware elements illustrated in FIG. 2 is virtually implemented by virtual machine software, and its behavior is similar to that of the physical server 103. The hardware elements in each of the virtual servers 104 and 105 actually use and reproduce a part of a hardware resource of the physical server 103. A virtualization technique is a general function, and hence details thereof is omitted.

Figure 3:
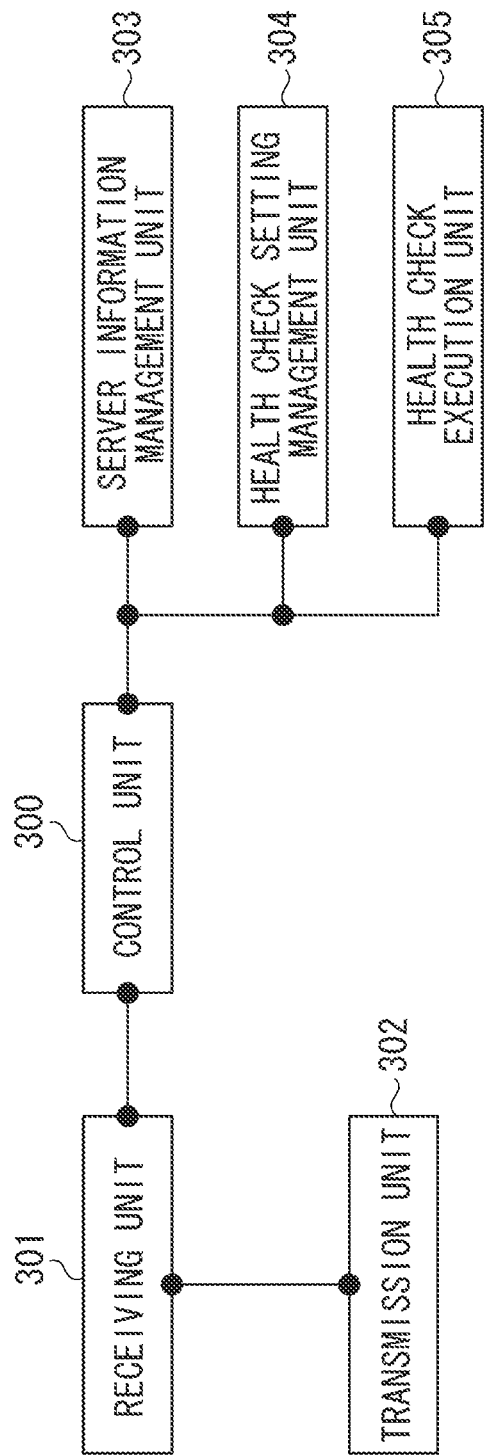
FIG. 3 illustrates a software configuration of a load balancer.

FIG. 3 is a block diagram illustrating a configuration of software modules in the load balancer 102 according to an exemplary embodiment of the present invention. The software modules are managed by the secondary storage device 206 in the load balancer 102 and are executed by the CPU 203 so that each of the functions is implemented. Description of processing not directly associated with the present exemplary embodiment is omitted.

A control unit 300 controls the entire load balancer 102, and designates and manages each of components serving as the software modules. A receiving unit 301 receives a request transmitted from the client device 101 connected thereto via the network 100. An example of data representing the request received from the client device 101 by the receiving unit 301 is illustrated in a HyperText Transfer Protocol (HTTP) request data table.

TABLE 1

HTTP Request Data Table

| | |
|---|---|
| HTTP request | GET http://webapp.com/appl/method1 HTTP/1.1 |
| HTTP header | (omitted) |
| HTTP body | (omitted) |

An HTTP request column is a column storing a Uniform Resource Locator (URL) of a transmission destination of a request, an HTTP method of the request, and a value of a transmission protocol of the request. In the example illustrated in Table 1, the transmission destination URL is "http://webapp.com/app1/method1", the HTTP method is "GET", and the transmission protocol is "HTTP/1.1". An HTTP header column is a column storing HTTP header information about the request. The HTTP header column is not associated with a behavior in the load balancer 102, and hence description thereof is omitted. An HTTP body column is a column storing HTTP body information about the request. The HTTP body column is not associated with a behavior in the load balancer 102, and hence description thereof is omitted.

A transmission unit 302 transmits the request received from the client device 101 to the virtual servers 104 and 105 via the network 100. The transmission unit 302 transmits a response received from the virtual server 104 to the client device 101. A server information management unit 303 manages information about the virtual server to which the request from the client device 101 is to be distributed. If the receiving unit 301 receives the request from the client device 101, the transmission unit 302 determines the virtual server serving as a distribution destination of the request based on the information managed by the server information management unit 303. An example of data representing server information about the virtual server serving as a distribution destination managed by the server information management unit 303 is illustrated in a server information table.

TABLE 2

Server Information Table

| Management ID | distribution destination server URL | Operational status | Previous confirmation date |
|---|---|---|---|
| 1 | URL of virtual server 104 | Normal | 2015 Dec. 31 00:00:00 |
| 2 | URL of virtual server 105 | Off-normal | 2015 Dec. 31 00:00:15 |

A management ID column is a column storing an identifier (ID) assigned to uniquely manage information about a server to which the load balancer 102 distributes a request. A distribution destination server URL column is a column storing a URL of a virtual server to be a candidate as a distribution destination of the request. The load balancer 102 transfers the request from the client device 101 to the URL registered in the distribution destination server URL column. An operational status column is a column storing operational status information about a virtual server to be a candidate as a distribution destination of the request. The operational status information is acquired by a health check execution unit 305, described below. A previous confirmation date column is a column storing a date on which a previous health check is completed.

A method for distributing the request by the load balancer 102 is not covered by the present exemplary embodiment, and hence description thereof is omitted. Generally, there are various methods such as a method for sequentially distributing the request to distribution destinations registered in a server information table and a method for preferentially distributing the request to a server having a light load, as discussed in Japanese Patent Application Laid-Open No. 2012-185577. A health check setting management unit 304 manages health check setting information about a virtual server to which the load balancer 102 distributes the request from the client device 101. An example of data representing the health check setting information managed by the health check setting management unit 304 is illustrated in a health check setting information table.

TABLE 3

Health Check Setting Information Table

| Health check URL | Timeout | Interval | Normal threshold value | Off-normal threshold value |
|---|---|---|---|---|
| /health/check.rb | 5 sec | 30 sec | 3 | 5 |

A health check URL column is a column storing a URL of a transmission destination of a health check request. A health check URL is described with a relative path. A timeout column is a column storing a timeout period of time elapsed until the load balancer 102 receives a response after transmitting the health check request. When the response to the health check request is not returned even if not less than the timeout period of time stored in the timeout column elapses, the load balancer 102 determines that a health check result is off-normal. The load balancer 102 exempts a virtual server, for which a health check result is off-normal, from a request distribution target to avoid a situation where request processing is not performed.

A normal threshold value column is a column storing the number of times a normal response to the request is continuously received for the load balancer 102 to determine that the health check result is "normal". The health check execution unit 305 updates a value in the operational status column of a server in the server information table to "normal" when it receives the normal response only the number of times corresponding to a value stored in the normal threshold value column. An off-normal threshold value column is a column storing the number of times an error response to the request is continuously received for the load balancer 102 to determine that the health check result is "off-normal". The health check execution unit 305 updates a value in the operational status column of the corresponding server in the server information table to "off-normal" when it receives the error response only the number of times corresponding to a value stored in the off-normal threshold value column.

The health check execution unit 305 in the load balancer 102 stores a date on which the response of the health check request is received in a value in the previous confirmation date column of a corresponding record in the server information table. The health check execution unit 305 transmits the health check request to each of the virtual servers registered in the server information table. A setting of the health check request is transmitted according to the health check setting information table. The health check execution unit 305 analyzes the response to the health check request, and confirms whether the health check result is normal or off-normal. The virtual server for which the health check result is normal is considered as a virtual server to which a request transmitted from a client is to be transmitted.

Figure 4:
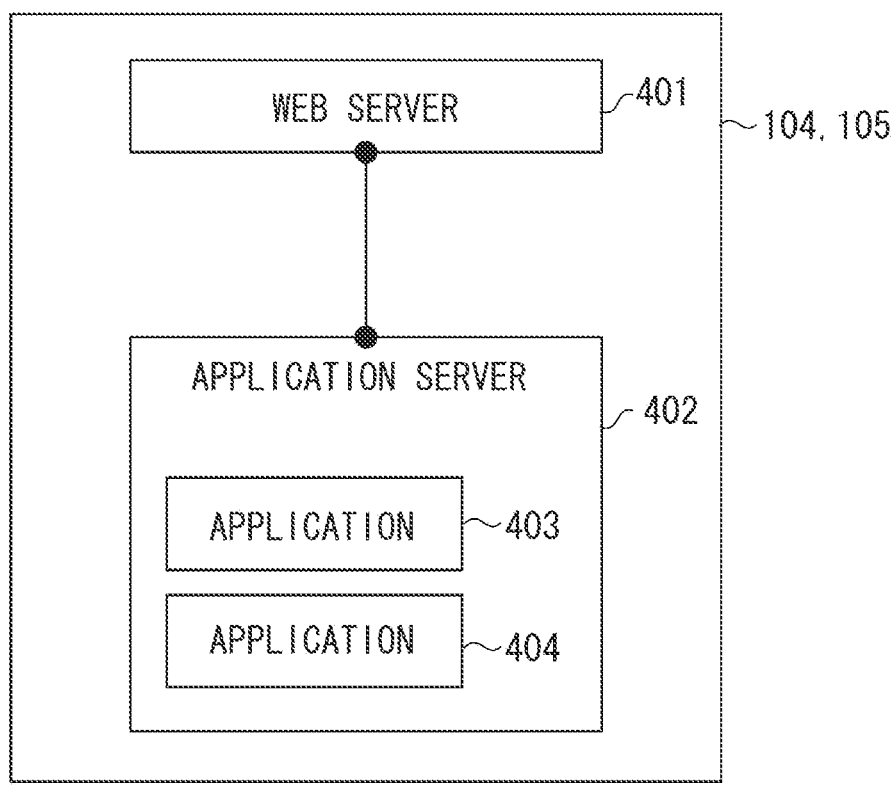
FIG. 4 illustrates a software configuration of a server.

FIG. 4 is a block diagram illustrating a software configuration of each of the virtual servers 104 and 105 according to the exemplary embodiment of the present invention. A web server 401 is web server software for receiving a request from the client device 101. The web server 401 performs processing received from the client device 101, creates a response from an execution result, and returns the created response to the client device 101. The web server 401 may transfer the request received from the client device 101 to an application server 402 and return an execution result of processing in the application server 402 as a response to the client device 101. The web server 401 performs any processing, as needed, depending on a content of the request from the client device 101.

The application server 402 is application server software for processing the request from the client device 101 which has been transferred from the web server 401. The application server 402 has one or more applications 403 and 404 disposed therein, and determines an application executed by the application server 403 depending on a content of the request. More specifically, a plurality of applications is disposed in one virtual server. The application serve 402 transfers an execution result of the request to the web server 401.

The present exemplary embodiment presupposes that the web server 401 and the application server 402 exist on the same virtual server 104 or 105. Detailed description of the web server 401 and the application server 402 will be described below. While the number of applications disposed in the application server 402 is two in the present exemplary embodiment, the number of applications is not intended to be limited. The number of applications disposed in the application server 402 is not limited if it is one or more. In the present exemplary embodiment, an example of respective processing contents of the applications 403 and 404 and respective requests received thereby is illustrated in Table 4.

TABLE 4

| Application column | Application URL | Application outline | Public function | HTTP method | Request format |
|---|---|---|---|---|---|
| Application 403 | app1/ Product | Product information management | Registrat of Product information | POST | ProductName: <one-byte alphanumeric character> Price: <numbers> |
| Application 404 | app2/ User | User information management | Updating of user information | PUT | UserID: <one-byte alphanumeric character> UserName: <one-byte alphanumeric character> |

An application column is a column storing respective values for identifying applications operating on each of the virtual servers 104 and 105. An application URL column is a column storing a value of a URL when a request is transmitted to the application. An application outline column is a column storing a specific content implemented by the application. A public function column is a column storing a function name which the application publishes to the client device 101. An HTTP method column is a column in which an HTTP method in transmitting the request for the client device 101 to execute a function indicated in the public function column is defined. A request format column is a column which defines a format of data stored in a request body when a request is transmitted for the client device 101 to execute the function indicated in the public function column. When a value which runs contrary to the definition is stored in the request body and the request is transmitted to each of the applications, the application returns a normal error. For example, the application 403 is an application for managing product information, and the application 404 is an application for managing user information.

Figure 5:
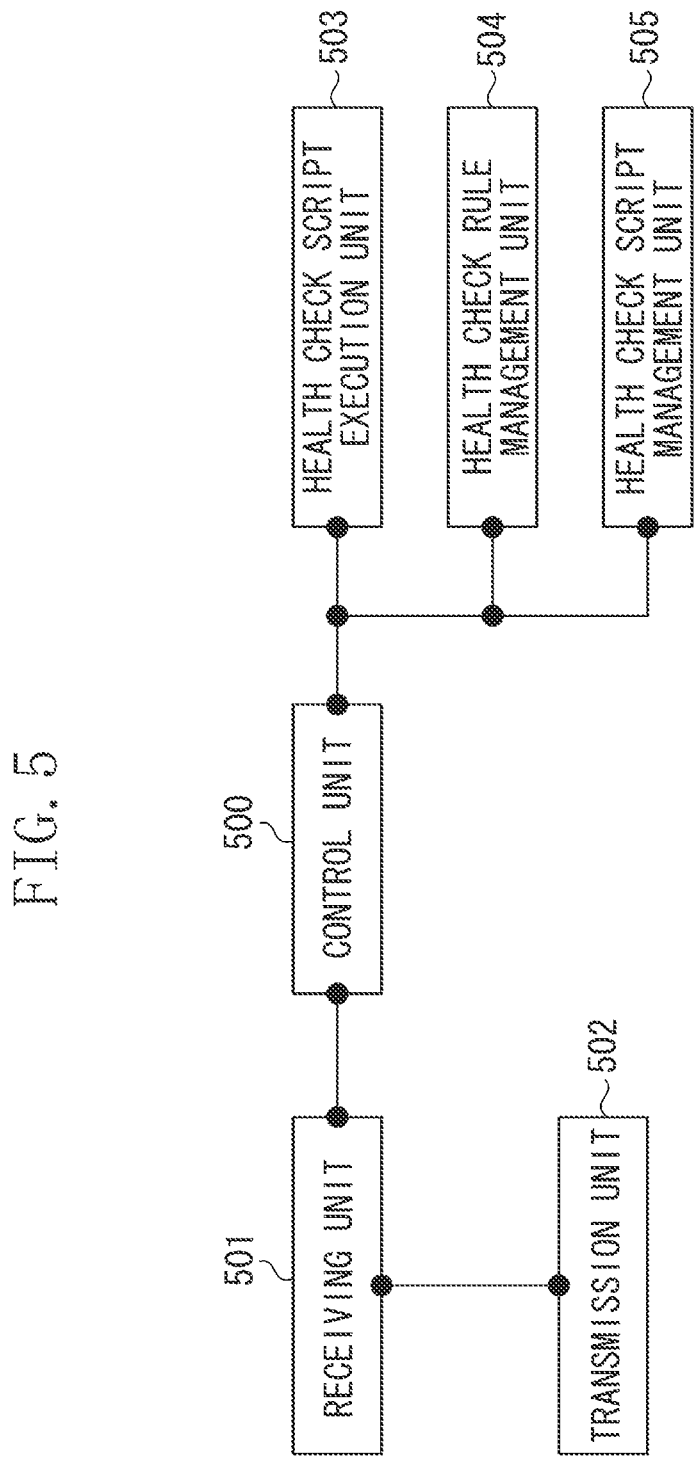
FIG. 5 illustrates a software configuration of a web server.

FIG. 5 is a block diagram illustrating a configuration of software modules in the web server 401 according to the exemplary embodiment of the present invention. The software modules are managed by the secondary storage device 206 and are executed by the CPU 203 in each of the virtual servers 104 and 105 so that each of functions is implemented on the virtual server. Description of a processing unit not directly associated with the present exemplary embodiment is omitted.

A control unit 500 controls the entire web server 401, and designates and manages each of components serving as the software modules. A receiving unit 501 performs processing for receiving respective requests transmitted from the client device 101 and the load balancer 102 connected to each other via the network 100. The request from the client device 101 is an execution request to an application mainly disposed in the application server 402. The request from the load balancer 102 is a health check request to the server 103. A transmission unit 502 transmits a response to the client device 101 and the load balancer 102 via the network 100. The transmission unit 502 transfers the received request to the application server 402 via the network 100. A health check script execution unit 503 performs health check processing when the request received by the receiving unit 501 is the health check request from the load balancer 102. An example of data representing the request received by the receiving unit 501 is illustrated in a health check request table.

TABLE 5

Request Table

| HTTP method | Request transmission source URL | Request transmission source URL |
| --- | --- | --- |
| GET | URL of load balancer 102 | URL/health/check.rb designating health check script on virtual server |

An HTTP method column is a column storing an HTTP method name of a request. The HTTP method column stores a value "GET" when the request is a health check request. A request transmission source URL column is a column storing a URL of a terminal which has transmitted the request. The request transmission source URL column stores a URL of the load balancer 102 if the request is the health check request. The web server 401 returns an execution result of the health check request to the URL stored in the request transmission source URL column. A request transmission destination URL column is a column storing a URL of a transmission destination of the request. The request transmission destination URL column stores a URL of a health check script stored in a health check script management unit 505 in the web server 401 if the request is the health check request.

The health check script execution unit 503 acquires the health check script and a health check rule, respectively, from the health check request management unit 505 and a health check rule management unit 504 according to the health check request, and performs health check processing. The health check rule management unit 504 collectively manages, as the health check rule, respective parameter values to be substituted into the health check script executed by the health check script execution unit 503. An example of data representing the health check rule managed by the health check rule management unit 504 is illustrated in a health check rule table. In the health check rule table, a rule is defined for each of web applications, and a corresponding health check request is transmitted to each of the web applications.

TABLE 6

Health Check Rule Table

| Rule number | HTTP method | Health check request transmission destination URL | Health check request body | Health check success determination response code |
| --- | --- | --- | --- | --- |
| 1 | POST | /app1/Product | ProductName: multifunction peripheral Type A Name: MFPA001 | 400 |
| 2 | PUT | /app2/User | UserID: 99999 UserName:HealthCheck USer | 404 |

A rule number column is a column storing a number for uniquely identifying a rule of a health check request which the health check script execution unit 503 transmits to the application server 402. An HTTP method column is a column storing an HTTP method of the health check request which the health check script execution unit 503 transmits to the application server 402. As a value of the HTTP method stored in the HTTP method column, a value of the HTTP method corresponding to the application illustrated in Table 4 is stored.

A health check request transmission destination URL column is a column storing a URL of a transmission destination of the health check request which the health check script execution unit 503 transmits to the application server 402. A value stored in the health check request transmission destination URL column corresponds to each of the applications 403 and 404 operating on the application server 402. More specifically, the health check request transmission destination URL column stores the value in the application URL column illustrated in Table 4. A health check request body column is a column storing request body information about the health check request which the health check script execution unit 503 transmits to the application server 402. A value stored in the health check request body column differs depending on the value in the health check request transmission destination URL column. More specifically, the health check request body column stores the information defined in the request format column corresponding to the application illustrated in Table 4.

A case of a health check rule in which a value in the rule number column is "1" means that the health check script execution unit 503 transmits to the application 403 a request, in which a value in the HTTP method column is "POST" and a value of "ProductName" is "multifunction peripheral TypeA" and a value of "Name" is "MFPA001" in the health check request body column, according to the definition illustrated in Table 6.

A health check success determination response code column is a column storing an HTTP response code indicating that it is determined that the applications 403 and 404 are normally operating in a response to the health check request received from the application server 402 for the request which the health check script execution unit 503 has transmitted based on the health check rule. A value stored in the health check success determination response code column may be a value other than an HTTP response code "200" generally meaning a normal response.

If the health check script execution unit 503 transmits a request based on a health check rule in which a value in the rule number column is "1" to the application 403, for example, a value of "ProductName" in the health check request body column includes a double-byte character. The application 403 determines a value of "ProductName" as "one-byte alphanumeric character", as indicated by the value in the request format column in Table 4. Therefore, it is predicted that the request transmitted by the health check script execution unit 503 is an incorrect request for the application 403. Therefore, the health check success determination response code column stores an HTTP response code "400".

An object of a health check request is to confirm that an application is operating. A request based on a health check rule in which a value in the rule number column is "1" is determined as an incorrect request for the application 403. However, the determination means that the application 403 is normally operating and the incorrect request has been correctly determined to perform error processing.

On the other hand, if the application 403 is not normally operating, the server cannot correctly process the request. In such a case, a value in the 500s of an HTTP response code indicating that an abnormality has occurred in the application server 402 on which the application 403 operates is returned to the client device 101. Therefore, when a rule in which a value in the health check success determination response code column is other than values in the 500s is registered in the health check rule table, an operational status of the application server 402 can be checked. The health check script management unit 505 manages the health check script executed by the health check script execution unit 503. When the health check script is executed, the health check request is transmitted to each of the applications.

FIG. 6 is a block diagram illustrating a configuration of software modules in the application server 402 according to the exemplary embodiment of the present invention. The software modules are managed by the secondary storage devices 206 and are executed by the CPU 203 in each of the virtual servers 104 and 105 so that each of functions is implemented. Description of a processing unit not directly associated with the present exemplary embodiment is omitted.

A control unit 600 controls the entire application server 402, and designates and manages each of components serving as the software modules. A receiving unit 601 performs processing for receiving respective requests transmitted from the client device 101 and the load balancer 102 connected to each other via the network 100. A transmission unit 602 returns, to the web server 401, a response serving as an execution result of an application execution unit 603 via the network 100. The application execution unit 603 executes the application 403 or 404 corresponding to the request received by the receiving unit 601. The application execution unit 603 also executes a request for confirming whether an application is normally operating, transmitted by the web server 401 which has received a health check request, i.e., a request transmitted according to a health check rule. While such a request is a request for confirming a health check, the request is just like a content of a normal request different from the health check request for each of the applications 403 and 404. One point of the exemplary embodiment of the present invention is that when the above-described configuration is implemented by a virtual server, even if a function corresponding to a health check request is not mounted on each of applications, a health check of the application can be performed.

FIG. 7 is a flowchart illustrating a series of processes for causing the load balancer 102 to perform a health check for the server 103 and the virtual servers 104 and 105 operating on the server 103 according to the exemplary embodiment of the present invention. In step S701, the health check execution unit 305 in the load balancer 102 confirms that a record is registered in a server information table managed by the server information management unit 303. The health check execution unit 305 compares a value in the previous confirmation date column of the record with a current time, and confirms whether there is a server for which a health check has not yet been performed. More specifically, the health check execution unit 305 confirms whether the current time managed by the load balancer 102 is after a lapse of a period of time equal to or more than a value in an interval column in the health check setting information table from the time in the previous confirmation date column. If a virtual server for which a period of time equal to or more than the value in the interval column has elapsed since the previous health check has been performed exists (YES in step S701), the processing proceeds to step S702. If a virtual server for which a period of time equal to or more than the value in the interval column has elapsed since the previous health check has been performed does not exist (NO in step S701), the load balancer 102 ends processing once, and the processing proceeds to step S701 again after a lapse of a predetermined period of time.

In step S702, the health check execution unit 305 creates a health check request. More specifically, the health check execution unit 305 stores a URL retained by itself in the request transmission source URL column in the health check request table. The health check execution unit 305 stores a URL, which connects a value in the distribution destination server URL column in the server information table and a value in the health check URL column in the health check setting information table, in the request transmission destination URL column in the health check request table.

In step S703, the transmission unit 302 transmits the health check request to each of the virtual servers 104 and 105. In step S704, the receiving unit 501 in the web server 401 operating on each of the virtual servers 104 and 105 receives the health check request from the load balancer 102, and performs health check processing. A detailed flow of the health check processing will be described with reference to FIG. 8. In step S705, the receiving unit 301 in the load balancer 102 receives a health check response from each of the virtual servers 104 and 105. An example of data representing the health check response received by the receiving unit 301 is illustrated in a health check response table.

TABLE 7

Health Check Success Response Table

| HTTP status code | Response Body |
|---|---|
| 200 | Success |

TABLE 8

Health Check Failure Response Table

| HTTP status code | Response Body |
|---|---|
| 503 | Failure |

An HTTP status code column is a column storing an HTTP status code representing meaning of a response from each of the virtual servers 104 and 105 to a health check request. In the present exemplary embodiment, if the health check request is executed and an operation of the virtual server has been successfully confirmed, a value of the HTTP status code is set to "200" to return the response. If the operation of the virtual server has been unsuccessfully confirmed, the value of the HTTP status code is set to "503" to return the response. A response body column is a column storing a value of a detailed content of the response from each of the virtual servers 104 and 105 to the health check request. Each of the virtual servers 104 and 105 confirms whether all applications disposed therein are normally operating and returns, if any one of the applications is not normally operating, a health check error response to the load balancer 102 at that time point, although details thereof will be described below. More specifically, even if any one of the applications is not normally operating, the load balancer 102 is notified that the virtual server cannot function. This can avoid a situation where a request from a client cannot be processed due to an incorrect operation of a server.

In step S706, the health check execution unit 305 in the load balancer 102 confirms a content of the health check response which has been received in step S705. If a value in the HTTP status code column is "200", it is determined that the health check has been successfully performed, and a current time is stored in a value in the previous confirmation date column in the server information table. In addition, if the health check has been successfully performed continuously the number of times corresponding to a value stored in the normal threshold value column in the health check setting information table, the health check execution unit 305 changes a value in the operational status column in the server information table to "normal". If the value in the HTTP status code column is other than "200", it is determined that the health check has been unsuccessfully performed, and a current time is stored in a value in the previous confirmation date column in the server information table. If the health check has been unsuccessfully performed continuously the number of times corresponding to a value stored in the off-normal threshold value column in the health check setting information table, the health check execution unit 305 changes a value in the operational status column in the server information table to "off-normal".

In step S707, the control unit 300 in the load balancer 102 confirms the presence or absence of a virtual server for which a value in the operational status column in the server information table becomes "off-normal". If the virtual server for which the value in the operational status column becomes "off-normal" exists (YES in step 3707), the processing proceeds to step S708. If the virtual server for which the value in the operational status column becomes "off-normal" does not exist (NO in step S707), the processing proceeds to step S701.

In step S708, the control unit 300 in the load balancer 102 performs processing for exempting the virtual server, which has been recognized in step S707, from a monitoring target of the load balancer 102 and discarding the virtual server. More specifically, the control unit 300 deletes data representing a virtual server, and releases a resource constituting the virtual server while deleting a corresponding record from the server information table. In step S709, the control unit 300 in the load balancer 102 newly creates a virtual server, and registers the created virtual server in a monitoring target. More specifically, the control unit 300 newly generates data representing the virtual server while registering a corresponding record in the server information table.

FIG. 8 is a flowchart illustrating details of the health check processing performed by the web server 401 in step S704. In step S801, the receiving unit 501 in the web server 401 receives a request from the transmission unit 302 in the load balancer 102. In step S802, the receiving unit 501 confirms whether the received request is a health check request. More specifically, if in the health check request table, a value in the HTTP method column is "GET", a value in the request transmission source URL column is a URL of the load balancer 102, and a value in the request transmission destination URL column matches a value in the health check URL column in the health check setting information table, the receiving unit 501 determines that the received request is the health check request (YES in step S802), and the processing proceeds to step S803. If the received request is a normal request different from the health check request, the receiving unit 501 determines that the received request is a normal request to each of the applications 403 and 404 (NO in step S802), and the processing proceeds to step S815. In step S803, the receiving unit 501 delivers the health check request to the health check request execution unit 503.

In step S804, the health check script execution unit 503 acquires one health check rule record from the health check rule table managed by the health check rule management unit 504. In step S805, the health check script execution unit 503 confirms whether a health check rule record not yet executed has been successfully acquired. If the health check rule record not yet executed has been successfully acquired (YES in step S805), the processing proceeds to step S806. If the health check rule record does not exist in the health check rule table (NO in step S805), or if all health check rule records are acquired to entirely perform the health check processing, the processing proceeds to step S814. In step S806, the health check script execution unit 503 acquires a health check script from the health check script management unit 505. In step S807, the health check script execution unit 503 creates a request based on a value in each of the columns in the health check rule table of the health check rule record which has been acquired in step S804, and transmits the created request to the application server 402 via the transmission unit 502. For example, in the present exemplary embodiment, a request "POST" and a request "PUT" in the HTTP method column are respectively transmitted to a URL "/app1/Product" of the application 403 and a URL "/app2/User" of the application 404 based on Table 6.

In step S808, the receiving unit 601 in the application server 402 receives the request from the transmission unit 502 in the web server 401. In step S809, the application execution unit 603 refers to a value in the HTTP request column of the request which has been received in step S808.

The corresponding application out of the applications 403 and 404 operating on the application server 402 is selected. The application execution unit 603 transfers an HTTP request to the corresponding application, and executes the application. For example, in the present exemplary embodiment, a request, in which a value in the HTTP method is "POST" and a value of "ProductName" is "multifunction peripheral A" and a value of "Name" is "MFPA001" in the health check request body column, is transferred to the application 403 from the application execution unit 603. The application 403 first performs a format check of a value in the health check request body column according to a data format rule defined in the request format column in Table 4. The value of "ProductName" includes a double-byte character. Therefore, the application 403 determines that the received request is an incorrect request, and issues an HTTP response code "400".

In the present exemplary embodiment, a request, in which a value in the HTTP method column is "PUT" and a value of "UserID" is "99999" and a value of "Name" is "Health-CheckUser" in the health check request body column, is transferred to the application 404 from the application execution unit 603. The application 404 first performs a format check of a value in the health check request body column according to the data format rule defined in the request format column in Table 4. If the application 404 determines that the request is a normal request as a request of the format check, the application 404 confirms whether user information corresponding to the value of "UserID" exists. At this time, if user information in which the value of "UserID" is "99999" does not exist, an HTTP response code "404" meaning that data has not yet been detected is issued.

In step S810, the application execution unit 603 creates a health check response from an execution result in step S809, and transmits the created health check response to the receiving unit 501 in the web server 401 via the transmission unit 602. In step S811, the health check script execution unit 503 acquires a value in the HTTP status code column of the health check response which has been received in step S810. In step S812, the health check script execution unit 503 compares the value in the HTTP status code column which has been acquired in step S811 with the value in the health check success determination response code column of the health check rule record which has been acquired in step S805, and determines whether the values match each other. If the values match each other (YES in step S812), the processing proceeds to step S804. In step S804, the health check processing based on the health check rule record is continued again.

If the value in the HTTP status code column which has been acquired in step S811 and the value in the health check success determination response code column of the health check rule record which has been acquired in step S805 do not match each other even once as a result of the health check processing repeatedly performed in the health check script execution unit 503 (No in step S812), the processing proceeds to step S813. For example, in the present exemplary embodiment, responses of HTTP status codes "400" and "404" are respectively received from the application 403 and the application 404 in step S809, and the value in the HTTP status code column matches the value in the health check success determination response code column of the health check rule record. Therefore, it is determined that the application server 402 is normally operating, and the processing proceeds to step S814. If the application server is not operating when any one of the applications is executed, the HTTP status code "500" is returned so that the value in the HTTP status code column does not match the value in the health check success determination response code column of the health check rule record. As a result, the processing proceeds to step S813. In the present exemplary embodiment, it is assumed that even if the respective HTTP status codes from all the applications are not returned, an error in the health check is transmitted to the load balancer 102 at the time point where it is determined that any one of the applications is not normally operating. However, an error in the health check may be transmitted at the time point where the HTTP status codes from all the applications are returned.

In steps S813 and S818, the health check script execution unit 503 creates a health check error response representing a failure in the health check, and transmits the created health check error response to the load balancer 102 via the transmission unit 502. In steps S814 and S818, the health check script execution unit 503 determines that health check processing based on all the health check rules registered in the health check rule table has been successfully performed. The health check script execution unit 503 creates a health check success response, and transmits the created health check success response to the load balancer 102 via the transmission unit 502. In step S815, the receiving unit 601 in the application server 402 receives a request from the transmission unit 502 in the web server 401. In steps 816, S817, and S818, the application execution unit 603 executes the application corresponding to the request, which has been received in step S801, creates a response from an execution result, and transmits the created response to the load balancer 102.

According to the respective flowcharts illustrated in FIGS. 7 and 8, an operational status of a server can be grasped after an operational status of an application operating on the server is added. When the operational status of the application is grasped according to a record registered in a health check rule table, a health check can be performed by diverting the existing function without newly establishing a function for a health check in the application.

While the configuration according to the first exemplary embodiment aims at attaining a health check, a request to intentionally create an error response from a health check script is periodically transmitted to an application. Therefore, it becomes difficult to distinguish between a case where the application has actually transmitted the error response to a request from a user client and a case where the application has transmitted the error response for the purpose of the health check. More specifically, an amount of an error log recorded on a log file output by the application becomes large, and a cause of an error which has occurred by the request from the user client can be difficult to investigate. In the present exemplary embodiment, a method for suppressing an output of a log so that an error which has occurred by a request from the health check script and an error which has occurred by the actual request from the user client are easily distinguished will be described with reference to FIG. 9. In addition thereto, portions not described in the present exemplary embodiment are similar to that described in the first exemplary embodiment.

FIG. 9 is a flowchart illustrating details of log output processing performed when a corresponding application is executed based on a request received by a receiving unit 601 in an application server 402. The processing illustrated in the flowchart is substituted for steps S808 and S810 and steps S815 to S817 illustrated in FIG. 8 described in the first exemplary embodiment.

In step S901, the receiving unit 601 in the application server 402 receives a request from a transmission unit 502 in a web server 401. In step S902, the receiving unit 601 acquires URL information about a transmission source from an HTTP request column in a request. At this time, if the transmission source of the request is a health check script execution unit 503 in the web server 401, the web server 401 and the application server 402 are operating on the same server. Thus, a value "localhost" is stored in the HTTP request column. If the transmission source of the request is any client device 101, a value other than "localhost" is stored.

In step S903, an application execution unit 603 transfers an HTTP request to an application corresponding to the request which has been received in step S901, and executes the application. In step S904, the application execution unit 603 confirms whether the received request is a request which has been transmitted from a physical server 103. More specifically, the application execution unit 603 confirms a value of the URL which has been acquired in step 902. If the value is "localhost", it is determined that the received request is the health check request transmitted from the physical server 103 (YES in step S904), and the processing proceeds to step S906. If the value is a value other than "localhost", it is determined that the received request is a request transmitted from the client device 101 (NO in step S904), and the processing proceeds to step S905.

In step S905, the application execution unit 603 stores log data, which has been generated when the application is executed, in a secondary storage device 206 in the physical server 103.

In step S906, the application execution unit 603 creates a response from an execution result in step S903. In step S907, the application execution unit 603 transmits the response to a receiving unit 501 in the web server 401 via a transmission unit 602. According to the flowchart illustrated in FIG. 9, execution log information about the application created by the health check request is excluded, and only execution log information about the application created by the request from the client device 101 can be left.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-007428, filed Jan. 18, 2016, which is hereby incorporated by reference herein in its entirety.

What is claimed is:

1. A server system capable of communicating with a load balancer which transmits a client request from a client in a distributed manner and including a plurality of virtual servers, the server system comprising:
at least a processor and at least a memory coupled to the at least the processor and having stored thereon instructions, when executed by the at least the processor, and cooperating to act as:
a receiving unit configured to receive a health check request transmitted from the load balancer;
a transmission unit configured to, in a case where the health check request is received, transmit an HTTP request to each of a plurality of web applications disposed in the virtual server which has received the health check request, and configured to, in a case where it is determined that a request received from the load balancer is not the health check request, transmit a normal request to one web application; and
a control unit configured to, in a case where all responses are received from the plurality of web applications, transmit a notification that the virtual server that has received the health check request is normally operating in response to confirming that all the received responses indicate that the web applications are normally operating,
wherein the control unit transmits a notification that the virtual server that has received the health check request is not normally operating in a case where there is at least one web application that does not transmit a response, even if responses are received from some, but not all, of the plurality of web applications,
wherein the load balancer does not transmit the client request from the client to the virtual server that is not normally operating, and transmits the client request from the client to the virtual server that is normally operating, and
wherein the virtual server that is not normally operating includes some web applications that have transmitted responses, but the client request is not transmitted to the some web applications.

2. The server system according to claim 1, wherein the control unit transmits an error in the health check request to the load balancer when at least one of the received responses indicates that the web application is not normally operating.

3. The server system according to claim 1, wherein the control unit transmits an error in the health check request to the load balancer, in response to confirming that the response received from one of the plurality of web applications indicates that the web application is not normally operating, without waiting until the respective responses are received from the remaining web applications.

4. The server system according to claim 1, wherein the response indicating that the web application is normally operating includes a response code indicating a normal response and a response code indicating a response to an incorrect request, and does not include a response code indicating that an abnormality has occurred in the web application.

5. A method for controlling a server system capable of communicating with a load balancer which transmits a client request from a client in a distributed manner and including a plurality of virtual servers, the method comprising:

receiving a health check request transmitted from the load balancer;

transmitting, in a case where the health check request is received, transmit an HTTP request to each of a plurality of web applications disposed in the virtual server which has received the health check request, and configured to, in a case where it is determined that a request received from the load balancer is not the health check request, transmit a normal request to one web application; and performing control to, in a case where all responses are received from the plurality of web applications, transmit a notification that the virtual server that has received the health check request is normally operating in response to confirming that all the received responses indicate that the web applications are normally operating, wherein transmitting a notification that the virtual server that has received the health check request is not normally operating in a case where there is at least one web application that does not transmit a response, even if responses are received from some, but not all, of the plurality of web applications, wherein the load balancer does not transmit the client request from the client to the virtual server that is not normally operating, and transmits the client request from the client to the virtual server that is normally operating, and wherein the virtual server that is not normally operating includes some web applications that have transmitted responses, but the client request is not transmitted to the some web applications.

6. The method according to claim 5, wherein an error in the health check request is transmitted to the load balancer when at least one of the received responses indicates that the web application is not normally operating in the control.

7. The method according to claim 5, wherein an error in the health check request is transmitted to the load balancer, in response to confirming that the response received from one of the plurality of web applications indicates that the web application is not normally operating, without waiting until the respective responses are received from the remaining web applications in the control.

8. The method according to claim 5, wherein the response indicating that the web application is normally operating includes a response code indicating a normal response and a response code indicating a response to an incorrect request, and does not include a response code indicating that an abnormality has occurred in the web application.

9. A non-transitory computer-readable storage medium storing a program which causes a computer to perform a method for controlling a server system capable of communicating with a load balancer which transmits a client request from a client in a distributed manner and including a plurality of virtual servers, the method comprising:

receiving a health check request transmitted from the load balancer;

transmitting, in a case where the health check request is received, transmit an HTTP request to each of a plurality of web applications disposed in the virtual server which has received the health check request, and configured to, in a case where it is determined that a request received from the load balancer is not the health check request, transmit a normal request to one web application; and performing control to, in a case where all responses are received from the plurality of web applications, transmit a notification that the virtual server that has received the health check request is normally operating in response to confirming that all the received responses indicate that the web applications are normally operating, wherein transmitting a notification that the virtual server that has received the health check request is not normally operating in a case where there is at least one web application that does not transmit a response, even if responses are received from some, but not all, of the plurality of web applications, wherein the load balancer does not transmit the client request from the client to the virtual server that is not normally operating, and transmits the client request from the client to the virtual server that is normally operating, and wherein the virtual server that is not normally operating includes some web applications that have transmitted responses, but the client request is not transmitted to the some web applications.

* * * * *